United States Patent [19]

Smith

[11] 3,712,694

[45] Jan. 23, 1973

[54] ANTIFRICTION BEARING SPACER

[75] Inventor: Robert L. Smith, Phoenix, Ariz.

[73] Assignee: The Garrett Corporation, Los Angeles, Calif.

[22] Filed: March 8, 1971

[21] Appl. No.: 121,906

[52] U.S. Cl. ............................................308/199
[51] Int. Cl. ..............................................F16c 19/20
[58] Field of Search.............308/199, 200, 219, 230

[56] References Cited

UNITED STATES PATENTS

| 2,041,896 | 5/1936 | McGueer.................... | 308/DIG. 5 |
| 2,325,088 | 7/1943 | Wright et al................ | 308/215 |

FOREIGN PATENTS OR APPLICATIONS

| 453,157 | 12/1948 | Canada........................ | 308/200 |

Primary Examiner—Milton Kaufman
Assistant Examiner—Frank Susko
Attorney—Herschel C. Omohundro, John N. Hazelwood, Albert J. Miller and Jack D. Puffer

[57] ABSTRACT

This bearing spacer is a substantially cylindrical body with rounded corners joining the end and cylindrical side walls. It has a critical diameter and length so that it properly spaces adjacent bearings and is free to slide and turn about its own longitudinal axis in the bearing races without any tendency to tip or cock. The spacer is composed of a relatively incompressible, high temperature resistant material which gradually transfers a film to the bearing for lubricating them at high temperatures.

9 Claims, 5 Drawing Figures

PATENTED JAN 23 1973
3,712,694
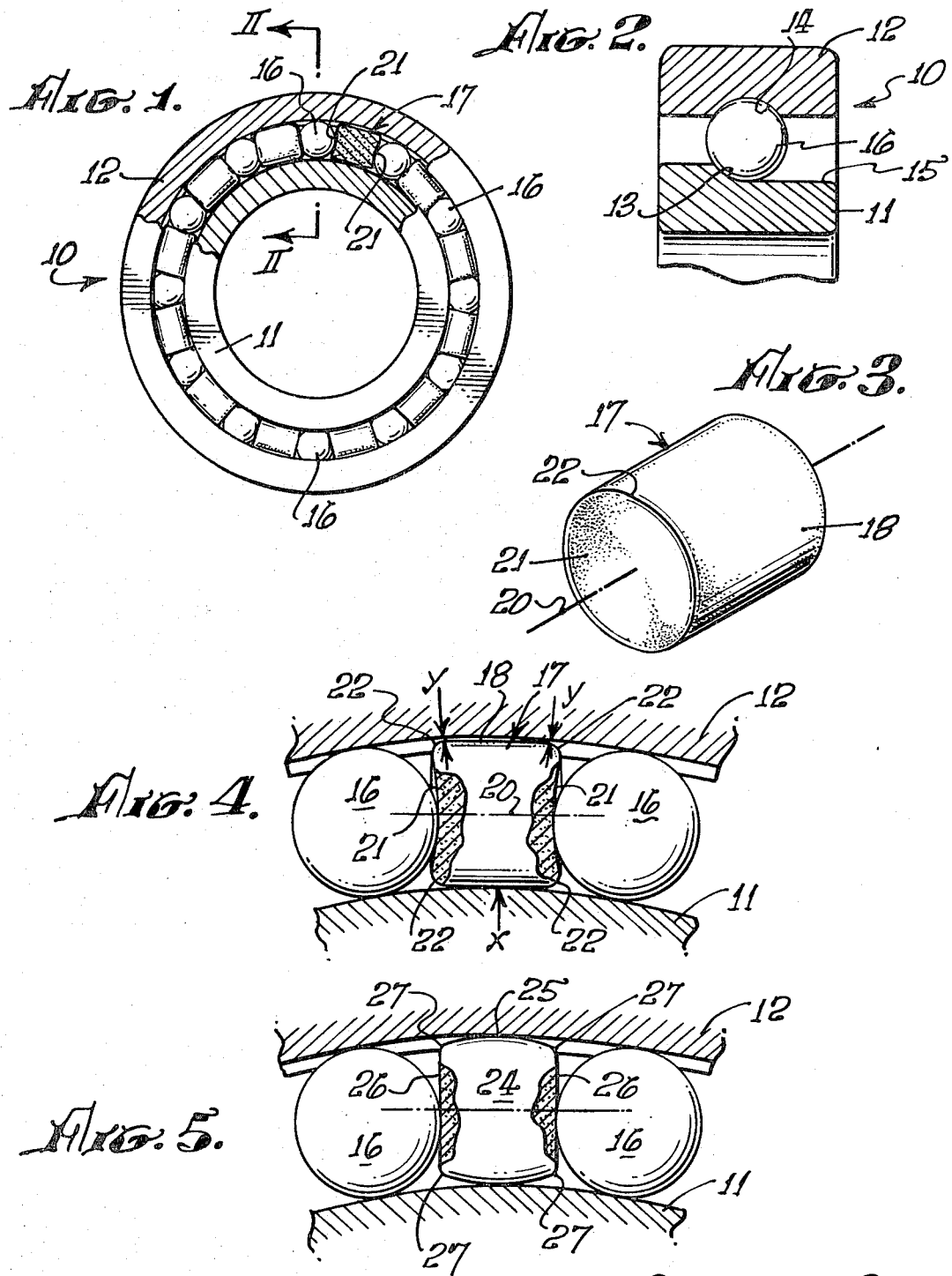
ROBERT L. SMITH,
INVENTOR.
BY
Herschel C. Omohundro
ATTORNEY.

ANTIFRICTION BEARING SPACER

BACKGROUND OF THE INVENTION

This invention relates to the antifriction bearing art as exemplified by the following U.S. Pats., No. 260,585 to Marston, No. 1,004,738 to Bright, No. 1,026,463 to Schneider, No. 1,405,894 to Borg, No. 3,058,789 to Ham, No. 3,199,934 to Van Wyk, No. 3,239,288 to Campbell, No. 3,356,427 to. Van WyK. These patents show various forms of bearings with spacing elements composed of a variety of materials, but the geometry, the size, temperatures, and strains to which they are exposed during use render them unsuitable for the intended use of applicant's bearings. The prior art bearings in most instances are complicated and expensive to manufacture and maintain.

SUMMARY

An object of this invention is to provide a simple bearing spacer which will reduce friction between the antifriction elements, make the bearings self-lubricating, capable of withstanding either high or low temperatures, simple to fabricate and assemble, and characterized by long life and minimum service requirements.

Another object of the invention is to provide a bearing spacer having a configuration and size which permit the use of the most economical number of antifriction elements in any particular bearing assembly and the retention of the elements and spacers in assembled relationship without fasteners or other additional means.

Still another object of the invention is to provide a bearing spacer having a cylindrical body with rounded corners joining the end and side walls, the spacer being relatively incompressible and composed of a high-temperature-resistant material from which a lubricating film gradually rubs as the spacer moves around between the races and is contacted by the bearing elements; since the spacer turns about its own longitudinal axis as it moves, no area is exposed to excessive wear and the useful life of the spacer is thus extended.

A still further object of the invention is to make the spacer, referred to in the previous paragraph, with predetermined critical dimensions which bear particular relation to the antifriction elements and the bearing races. The selected size relations facilitate the movement of the spacer in the races, the retention of the spacer in assembled relation, and the prevention of certain undesirable movements of the spacer.

Other objects and advantages will be apparent from the following description of bearing constructions embodying the invention and illustrated in detail in the accompanying drawing.

IN THE DRAWINGS

FIG. 1 is a side elevational view, partly in section, of a bearing assembly with spacers embodying the invention incorporated therein;

FIG. 2 is a vertical cross-sectional view taken through the bearing on the plane indicated by the line II—II of FIG. 1;

FIG. 3 is a perspective view of a spacer formed in accordance with the invention;

FIG. 4 is a detailed sectional view on an enlarged scale through a bearing with a spacer embodying the invention; and FIG. 5 is a similar view showing a slightly modified form of spacer.

Referring more particularly to the drawings, the bearing assembly in the first form of the invention illustrated is designated generally by the numeral 10. This bearing assembly has the usual inner and outer races 11 and 12, respectively, the former having a ball groove 13 in its outer surface and the latter having a ball groove 14 in its inner surface. The invention is shown as applied to an angular contact ball bearing, but is obviously applicable to bearings of other types as well. In the bearing shown, the inner race is relieved at one side, as indicated at 15, the depth of the ball groove on this side being limited to that required to prevent undesired separation of the parts during normal handling.

Bearing assembly 10 includes a plurality of ball elements 16 which are received for rolling movement in the grooves 13 and 14 to maintain the races 11 and 12 in concentric spaced relatively rotatable relationship.

In some instances such relation could be maintained by a plurality of ball elements only, but where the bearing is utilized in regions of elevated temperatures, under load, and difficult or impossible lubrication conditions, spacers are provided to prevent the ball elements from rubbing one another and prematurely deteriorating by galling, pitting, sliding, and/or fracturing.

According to this invention, a spacer 17 is disposed between each adjoining pair of ball elements 16. Spacer 17 in the preferred form of the invention, is a cylindrical body with a cylindrical sidewall 18, a longitudinal axis 20, end walls 21, and rounded corners 22 which fair smoothly into the side and end walls. The spacer is composed of a substantially incompressible, high-temperature-resistant material with lubricative characteristics. One such material found to be highly satisfactory in actual use is carbon-graphite.

The end walls of the spacer may be flat, but in the preferred form they are made slightly concave, as indicated in FIGS. 1, 3 and 4, which assists in retaining the spacers in assembled relationship with the ball elements.

The enlarged sectional view in FIG. 4 shows that the concave end walls of the spacer are engaged by the ball elements at points spaced slightly from the axial center whereby the rolling action of the balls will cause rotation of the spacer about its longitudinal axis 20 as it moves between the races with the balls. Any wear caused by the sliding motion of the spacer will thus be distributed over a greater area of the spacer and its useful life will be prolonged. It will also be noted that the length of the spacer is such as to prevent any tendency of the spacer to tip or cock and bind between the races. Any tendency to bind is further reduced by the rounded corners 22.

It will be noted from FIG. 4 that the side wall 18 of the spacer will engage the inner race at a point X substantially midway between the ends of the spacer. When so engaged, the rounded corners 22 will be spaced a limited distance Y, i.e., not more than 0.005 inch from the surface of the ball groove in the outer race. It will be recognized that due to such restricted engagement only slight resistance to movement will be exerted by the spacer. As previously suggested, the sliding engagement of the spacer with the races and ball elements will rub a small quantity of the graphite from the spacer in the form of a lubricating powder. This powder serves to maintain the bearing lubricated without further attention even when the bearing is exposed to elevated temperature conditions. In one application of the bearings they operated satisfactorily at a temperature of 900°F and a speed of 25,000 rpm. It is readily apparent that no liquid lubricant or organic polymer have such high temperature capabilities.

A slightly modified form of the invention is shown in FIG. 5. In this form the spacer 24 is not truly cylindrical, since the side wall 25 curves outwardly a limited distance and makes the body somewhat barrel shaped. This curvature of the outer wall slightly decreases the area of engagement of the spacer with the surface of the inner race and makes the body conform, or more closely approach the surface of the ball groove in the outer race. The end walls 26 of this form have been shown as flat, however, concave walls could be employed if desired. Rounded corners 27 between the side and end walls are used as in the form of invention first shown and described.

The modified spacer is also made of of a resistant incompressible lubricative material as in the first form, so that it may be used in areas exposed to high temperatures where conventional lubricants would fail.

I claim:
1. A spacer separating bearing members in an antifriction bearing comprising:
   a. a solid substantially incompressible body of material having lubricative characteristics and a generally cylindrical configuration; and
   b. a rounded corner connecting the generally cylindrical side and each of the end walls of said body, said body having a cylindrical diameter approximately 0.010 inch smaller than the diameter of the bearing members spaced thereby.

2. The bearing spacing means of claim 1 in which the body is composed of carbon graphite.

3. The bearing spacing means of claim 1 in which each end wall of the body is provided with a concave depression.

4. The bearing spacing means of claim 2 in which the body is resistant to temperature approximating 900°F.

5. The bearing spacing means of claim 2 in which each end wall of the body is provided with a concave depression.

6. An antifriction bearing comprising:
   an outer circular bearing race;
   an inner circular bearing race concentric with said outer race;
   a plurality of bearing members arranged between said bearing races;
   a plurality of cylindrical spacers having a cylindrical surface and opposed end walls, said spacers being interposed between said bearing members such that each end wall is adjacent one of said bearing members, said cylindrical spacers being formed of a substantially incompressible material having lubricative qualities and having the corner formed by the intersection of the cylindrical surface and each of the end walls a rounded corner.

7. An antifriction bearing according to claim 6 in which the cylindrical diameter of said spacers is approximately 0.010 inch less than the diameter of said bearing members.

8. An antifriction bearing according to claim 7 in which the end walls of said spacers are concave.

9. An antifriction bearing according to claim 7 in which the spacers are of carbon graphite.

* * * * *